Aug. 13, 1963     R. E. OLEKSIAK     3,100,888
CHECKING SYSTEM
Filed Dec. 13, 1960     4 Sheets-Sheet 2
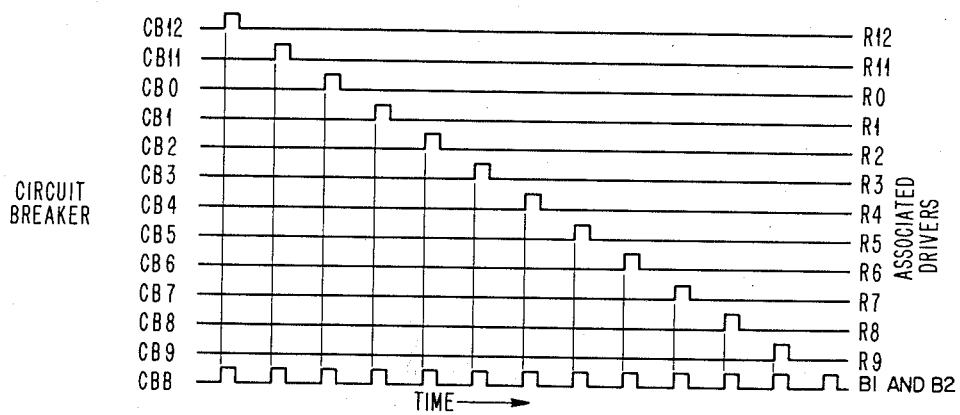
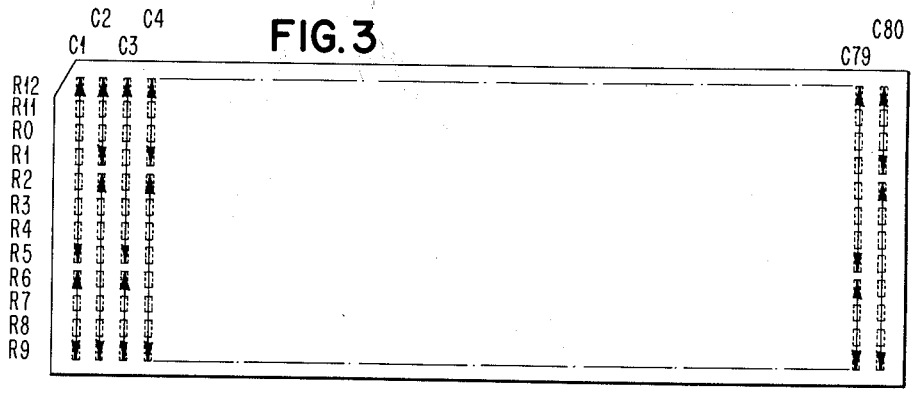
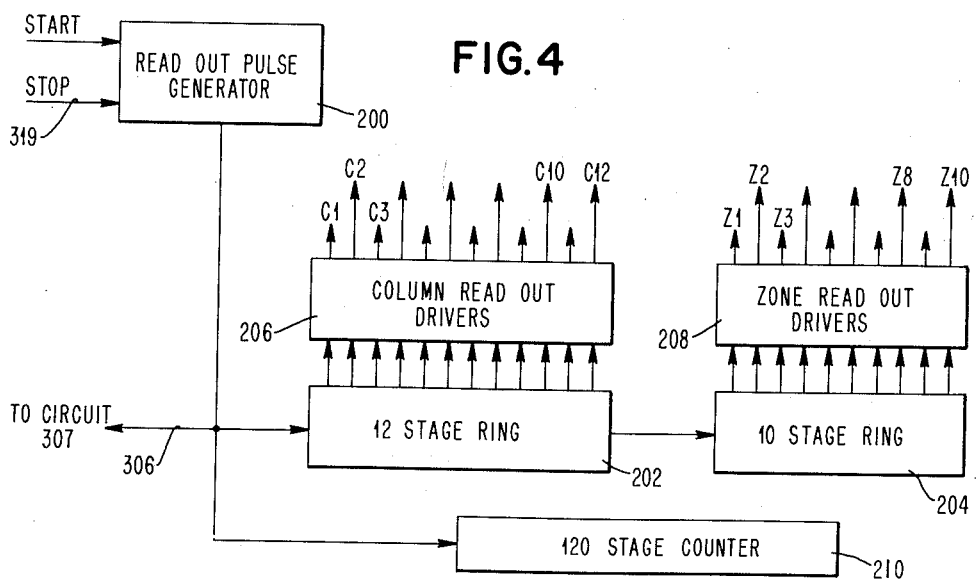

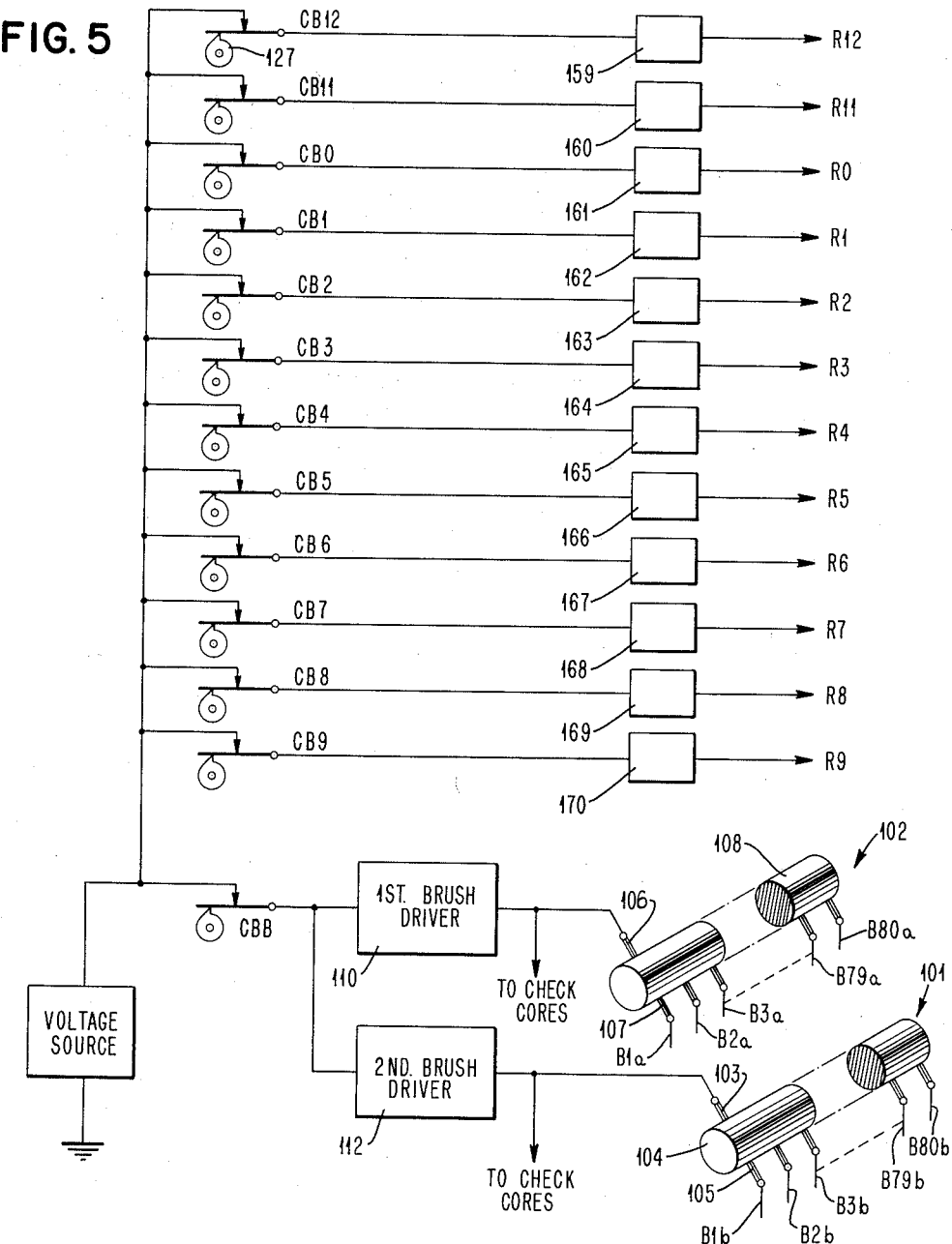

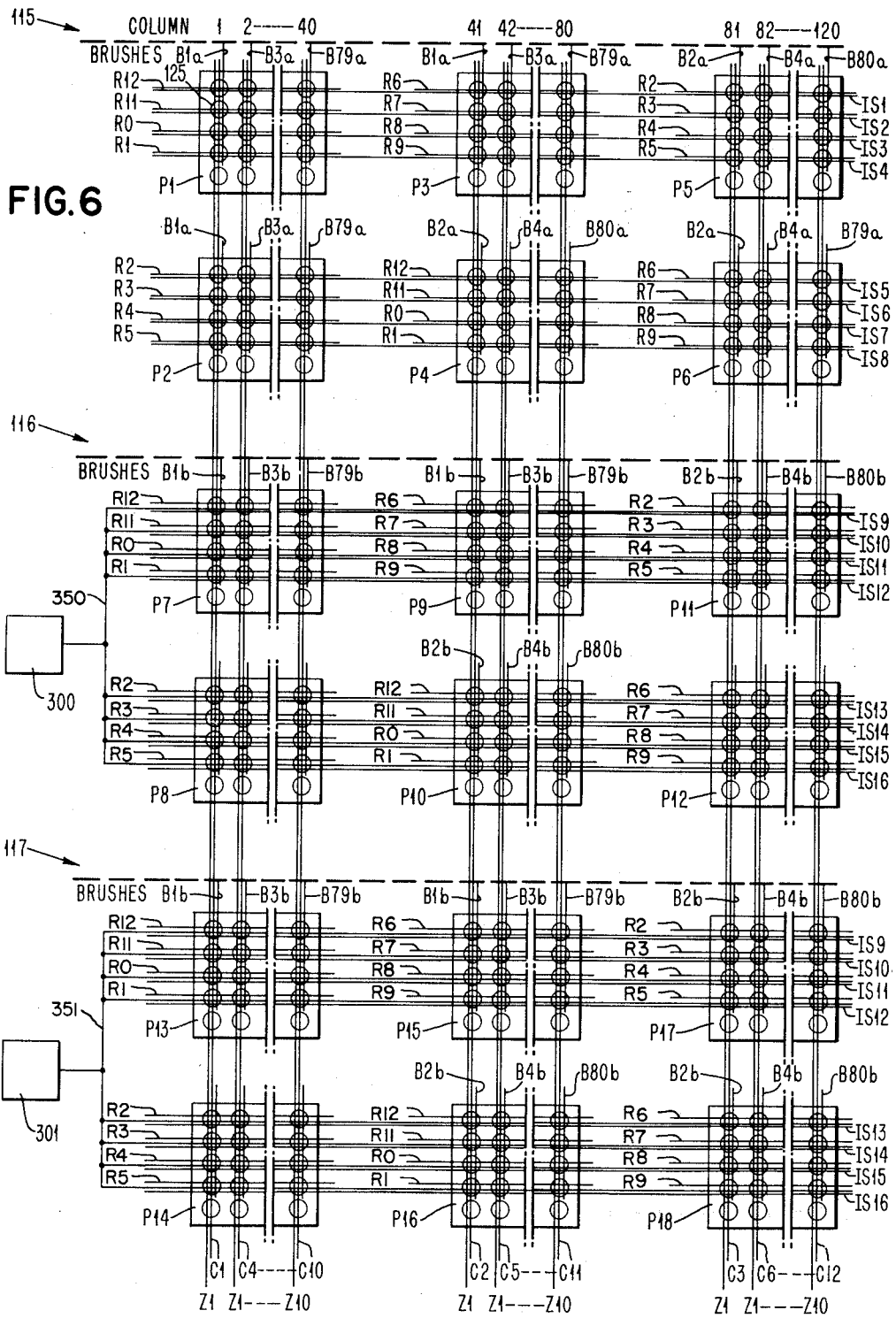

United States Patent Office 3,100,888
Patented Aug. 13, 1963

3,100,888
CHECKING SYSTEM
Robert E. Oleksiak, Brookline, Mass., assignor to International Business Machines Corporation, New York, N.Y., a corporation of New York
Filed Dec. 13, 1960, Ser. No. 75,560
1 Claim. (Cl. 340—174)

This invention relates to a device for checking whether certain other devices such as the components of a document reading system operated satisfactorily.

In systems wherein it is desired to check whether each of a plurality of devices operated satisfactorily, cost and other considerations usually dictate that a balance be effected between the type of system which provides an error indicating device for each device to be checked (in this type of system the source of an error can be exactly pinpointed) versus the type of system wherein a single error indicator is provided for several devices to be checked and wherein an indication on any indicator merely shows that one out of several devices failed to operate satisfactorily (in this type of system the source of an error cannot be exactly located).

If the devices whose operation is to be checked are adapted to operate in some known sequence a saving can be effected by utilizing a set-reset scheme. That is, the operation of one device to be checked sets the checking device and the operation of a second device to be checked resets this same device. A failure in either the setting or the resetting of the checking device pinpoints the source of the failure.

The present invention utilizes the set-reset scheme; however, the present invention goes much further than using the set-reset scheme. Through a novel pattern of overlapping a small number of indicating devices are utilized, yet the error can be pinpointed to its exact source.

In the exemplary preferred embodiment of the invention shown and described herein the checking device is applied to a document reading system.

The object of the invention is to provide a device for checking whether a plurality of other devices operated satisfactorily.

A further object is to provide a circuit which will pinpoint the source of a failure.

A further object is to provide a circuit which has a relatively small number of components.

A further object is to provide a circuit of the kind described which is adaptable to modular packaging techniques.

Another object is to provide a circuit to detect power failure in a document reading system.

A further object is to provide a simple inexpensive circuit for checking the operation of a plurality of sequentially actuated drivers which read information into and out of a magnetic core matrix.

The foregoing and other objects, features and advantages of the invention will be apparent from the following more particular description of a preferred embodiment of the invention, as illustrated in the accompanying drawings.

In the drawings:

FIG. 2 is a timing diagram for the row driver circuits.

FIG. 3 is a diagram of the type of record cards which are read by the embodiment shown herein.

FIG. 4 is a circuit diagram of the circuitry which activates the read-out lines.

FIG. 5 is a circuit diagram of the circuitry which reads the record cards and which activates the row, column and brush drive lines.

FIG. 6 is a circuit diagram of the magnetic core matrix wherein the information which is read from the documents is temporarily stored.

Figure 1:
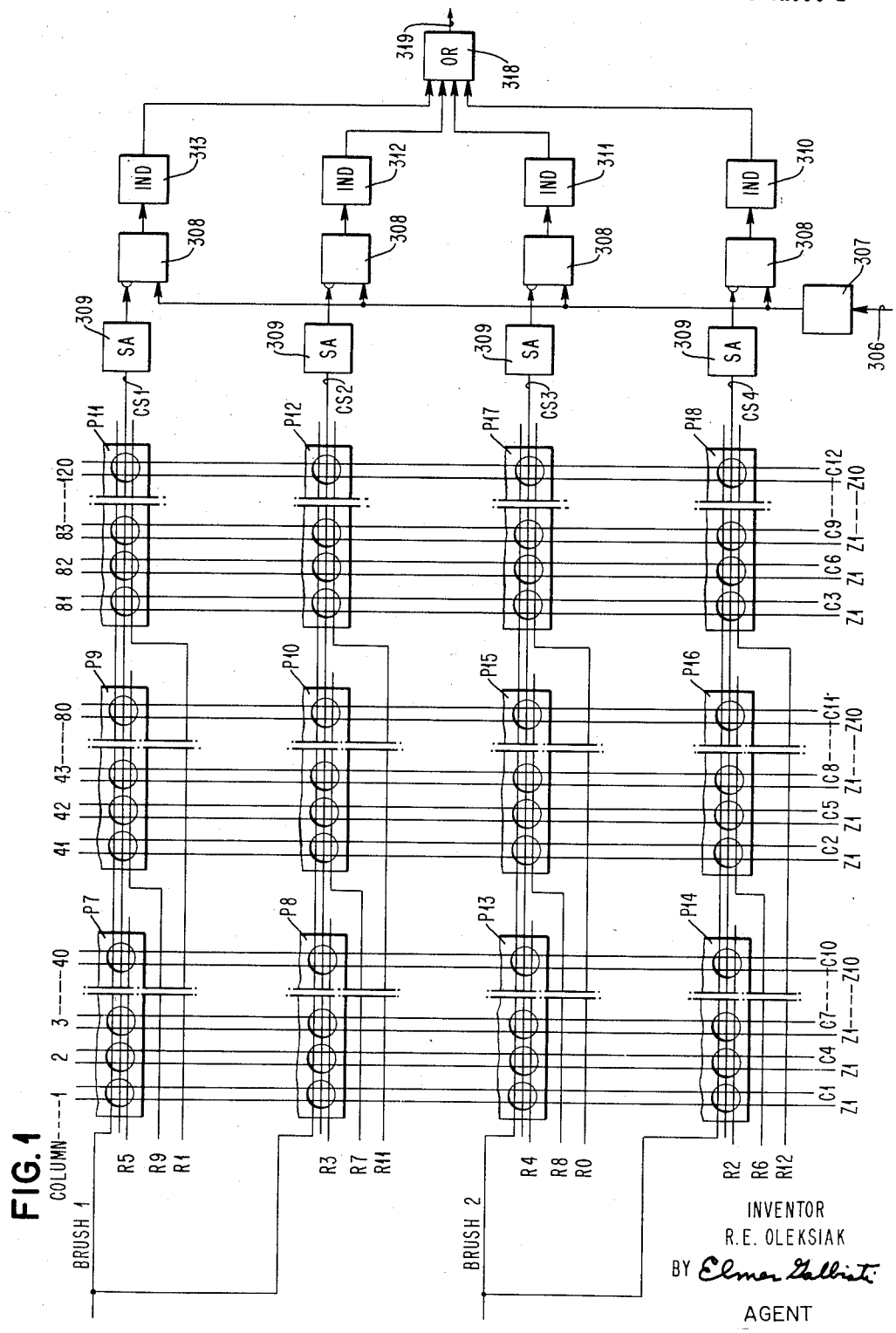
FIG. 1 is a circuit diagram of a checking circuit for a document reading system.

In general the invention as shown in the embodiment described herein can best be understood by first considering merely the checking circuit which is shown in FIG. 1. Each of the magnetic core matrices marked P7 to P18 contains a row of check cores which has forty check cores therein. (NOTE.—only four cores are specifically shown in the drawing.)

As will be explained in detail later, the cycle of the system in which the checking circuit is here shown embodied is divided into two sections. During the first section of the cycle, if all of the parts of the system (which the checking circuit of FIG. 1 is designed to check) function satisfactorily, all of the drive lines, R, shown as horizontal lines in FIG. 1 (i.e., R12, R11, R0 . . . R9) will be activated and during the second portion of the cycle all of the drive lines C and Z shown as vertical lines in FIG. 1 (i.e., C1 to C10 and Z1 to Z10) will be activated. The function of the invention as here shown embodied is to determine if the various lines indicated above were activated.

More specifically if the drivers (which this circuit is designed to check) operate satisfactorily: (a) the row drive line, R (i.e., R12, R11, R0, R1 . . . R9) will be sequentially activated during the read-in cycle (see FIG. 2); (b) each time a row drive line is activated the brush drive lines, B (i.e., B1 and B2), will also be activated (see FIG. 2); (c) the zone drive lines, Z, will be cyclically (i.e., Z1 to Z10) activated once during each read-out cycle; and (d) the column drive lines, C, will be cyclically (i.e., C1 to C12) activated each time a zone drive line is activated, i.e., each column drive line will be activated ten times during each read-out cycle; however, each of the activations will be coincident with the activation of a different zone drive line.

The circuit shown in FIG. 1 is designed to check if each of the operations designated a, b, c and d above occurred as it should have.

During the read-in cycle, if each of the row drive lines, R, and each of the brush drive lines, B, operates satisfactorily, the two drive lines passing through each core (shown in FIG. 1) will have coincident current pulses thereon sometime during the read-in cycle, hence all of the cores shown in FIG. 1 will be set during each read-in cycle.

Likewise during the read-out operation, each of the vertical rows will receive coincident current pulses from two drive lines (the zone and column drive lines) in the following order: 1, 41, 81, 2, 42, 82, . . . 40, 80, 120. (The purpose for having the machine operate in the sequence described above will be seen later.) When the zone and column drive lines in any column of the matrix are coincidently pulsed, the cores in the respective column will be reset (if the cores had been previously set), thereby producing pulses on the associated sense lines. Hence, if all the read-in drive lines and all of the read-out drive lines operate satisfactorily, lines CS1, CS2, CS3 and CS4, will be pulsed each time a column drive line is activated (120 pulses). The failure of any core to give an output will be indicated by one of the indicators 310 to 313.

In order to understand how the source of an error is located, it is necessary to note (a detailed explanation will be given later) that other circuitry in the machine will indicate which column is being read out of the matrix at any time.

By way of example, some of the possible sources of error and how these sources of error would be located are given below.

(a) One of the row drive lines might have failed to operate. The error would be indicated by an indication on one of the indicators 310 to 313 as the matrix was being read out. By noting which column of the matrix was reading out and which indicator was active, the particular row drive line which failed could be located.

(b) If one of the brush drive lines had failed to operate when information was being stored in the matrix, two of the indicators would indicate a failure when the matrix was being read out. By noting which indicator is active, the particular brush drive line which failed could be identified.

(c) If one of the column or one of the zone drive lines failed to operate properly, all four of the indicators would indicate a failure. In this instance in order to particularly pinpoint the source of the error, it might be necessary to read out another column of the matrix (this will be explained in detail later).

More specifically described: in the embodiment shown herein the invention is applied to a system which is similar to the document reading system shown in copending application Serial No. 780,555, "Three Image Buffer System for Card Reader," by L. G. Allen, filed December 15, 1958. In general, IBM cards (FIG. 3) are read and the information thereon is temporarily stored in a magnetic core matrix (FIG. 6). Thereafter, the information is read from the magnetic core matrix and appears on information sense lines IS1 to IS16.

Two reading stations (FIG. 5) are provided (101 and 102). Each card is fed to station 101 and later fed to station 102. As each card is being read for the second time by station 102, the next document is being read for the first time by station 101.

The information read by station 102 is always stored (in a manner to be described) in six magnetic core planes P1 to P6. The information read at station 101 is alternately stored in the six planes P7 to P12 and P13 to P18, the location alternating with each card that is read.

The following is an example of the operating sequence. Assume that cards A and B (each of which is exemplified by the card shown in FIG. 3) are sequentially being fed through the machine. During the first read-in cycle, card A is first read at station 101 and the information is stored in the magnetic core matrix planes P7 to P12. Next a read-out cycle follows; however, through the action of inhibit circuitry which will be explained later, the read-out cycle will have no effect on planes P7 to P12. Next card A moves to station 102 and card B enters station 101. Both cards are then read. The information which is read from card A at station 102 is stored in planes P1 to P6, while the information read from card B at station 101 is stored in planes P13 to P18. Next, a read-out cycle occurs, during which planes P1 to P6 and planes P7 to P12 are read out, the information appearing on lines IS1 to IS16. The inhibit circuitry will prevent the destruction of the information stored in planes P13 to P18 during the read-out cycle.

Since the information which was stored in planes P1 to P6 and in planes P7 to P12 was the same information, merely being read at different read stations, the information which was read out of the two sets of planes should be identical. If there was any discrepancy, comparing circuits (not shown) give an indication thereof (the comparting circuits could be similar in design to the ones shown in the above referenced copending application).

The read stations 101 and 102 comprise the common read brushes 103 and 106, rolls 104 and 108, and the column brushes 105 and 107. The cards move between the column brushes and the rolls. If there is a hole in the card, contact will be made and a signal produced by the brush drivers 110 and 112 will appear on the respective column brush. The column brushes 107 are connected to the drum drive lines B1a to B80a and the column brushes 105 are connected to the column brushes B1b to B80b.

The row drivers 159 to 170 sequentially produce pulses on the twelve row drive lines (R12, R11, R0, R1, R2, R3, R4, R5, R6, R7, R8 and R9).

The card drive mechanism at stations 101 and 102 and the cams 127 which activate the row drivers are synchronized so that the appropriate row driver is activated when the associated row of the card is being read. Assuming that there is a hole in the card at some particular location, the coincidence of pulses on the row drive line and the column drive line will set a particular core in the core matrices shown in FIG. 6. For example, a pulse on the column line B1a and the row line R11 will set the core 125 in plane P1 of FIG. 6.

The source of power for storing the information in the cores comprises the twelve row drivers 159 to 170 and the two brush drivers 110 and 112. As previously stated, each row driver is timed by cams 127 to give a pulse of power as the associated row of the card is being read. Each of the row drivers produces enough power to "half set" the magnetic cores which are associated therewith, i.e., those designated to store the information from the associated row of the document.

The second "half set" signal is provided by the brush drivers 110 and 112. When a data hole appears in the particular row of a card which is being read, the column brush 105 or 107 associated with the column of the card where the data hole appears, is activated by the respective brush driver 110 or 112. The timing for the row drivers 159 to 170 and for the brush drivers 110 and 112 is shown in FIG. 2.

The information is read from the core matrix by the column drivers 206, and the zone drivers 208 (FIG. 4), each of which supplies "half set" pulses to the associated zone and column drive line. The coincidence of pulses on the particular zone and column drive lines which pass through each core are effective to read information from the respective core, the information pulses appearing respectively on information sense lines IS1 to IS16.

The circuitry of this invention checks whether or not the brush, row, column and zone drivers operated satisfactorily. The fifth row of cores in each of the planes P7 to P18 is used for checking. The check cores are shown in FIGS. 1 and 6. One row of check cores is associated with each row driver, said cores being "half set" each time the associated row driver operates. The brush drivers supply the second "half set" pulses. If both the row and brush drivers operate satisfactorily, one row of check cores will be set each time a row of the card is read. Hence, at the end of the read-in cycle, all twelve rows of check cores will have been set.

After each read-in cycle there is a read-out cycle. As will be explained later the columns of the matrix are read out in the order 1, 41, 81; 2, 42, 82; 3, 43, 83; etc. The zone and column drivers which operate to read out the various columns of information from the matrix also read out the check cores. Since there is one row of check cores in each of the planes, there are four check cores in each column of the matrix. Furthermore, each of the four check cores in each column of the matrix is in a different row of the matrix. Hence, as any column of the matrix is read out a pulse should appear on each of the four check sense lines CS1 to CS4. The absence of the pulse on any of these lines indicates a malfunction somewhere in the system. As will be explained in detail later, it is possible to pinpoint the location of the malfunction.

One of the advantageous features of this invention which can be seen from the description of the circuitry is that a minimum amount of extra wiring and space are necessary for this device. The read-out winding for the check cores can be threaded through the check cores at the same time that the read-out windings are threaded through the cores which store the information, at a practically negligible increment in cost. The other windings of the check cores also involve a minimum of extra connections and the connections required are in the same general pattern as those required for the information storage cores. Furthermore, the circuitry is well suited to fit into the packing modules used in the overall device.

In the embodiment shown herein, the information to be read is stored on standard IBM cards (FIG. 3). These cards contain eighty columns and twelve bits of information per column. The information characters as contained on the cards and as used by the machine each comprise eight information bits; hence each column of the card contains one and one-half characters. As shown in FIG. 3, the first eight bits in column one comprise the first character, the second four bits in the first column and the first four bits in the second column comprise the second character, and the last eight bits in the second column comprise a third character. This same pattern is continued across the card.

As previously explained, the information read from the cards is temporarily stored in the magnetic core matrix shown in FIG. 6. Each of the matrices 115, 116 and 117 can store the amount of information which is contained on one card.

For ease in illustration only the first, second and last columns of cores are shown in FIG. 6. The first four rows of cores in each plane are used to store information, the last row of cores in matrices 116 and 117 is used for the checking circuit of this invention.

A detailed description of the information storage cores (the first four rows of cores) in matrix 115 will now be given, the other matrices are similar except for the inhibit circuitry which will be explained later. Matrix 115 consists of cores P1 to P6, each of which contains five rows of cores, each row having forty columns.

The information from the odd columns 1, 3, 5, etc. of the card is stored in planes P1, P2, and P3. The information from the even columns of the card is stored in planes P4, P5 and P6. The source of the information which is stored in each row of cores can be determined by an examination of FIG. 6. For instance, the first row in plane P1 contains the information from the twelfth row of the old columns of the card. The information from the even columns of the twelfth row is stored in the first row of plane P4. The first information character on the card, i.e., the first eight bits in the first column of the card are stored in the first column of the planes P1 and P2 (i.e., column 1); likewise, the second character is stored in the first column of planes P3 and P4 (i.e., column 41); and the third character is stored in the first column of planes P5 and P6 (i.e., column 81). The cycle repeats itself with the fourth character being stored in the second column of planes P1 and P2 (i.e., column 2). It can now be seen why the column read out sequence is 1, 41, 81; 2, 42, 82; etc.

The information bits are stored in the cores by having coincident current pulses on the two drive lines which pass through each core. For instance, current coincident on the R12 and B1a lines would set the first core in the first column of P1.

Information is read out of any core by having coincident current pulses on the two read-out drive lines which pass through each core. For instance, lines C1 and Z1 pass through core 125. Hence, if lines C1 and Z1 are coincidently pulsed, and if a "one" had previously been stored in core 125, a signal would be produced on information sense line IS2.

Arrays 116 and 117 are provided with inhibit lines which prevent the read-out circuits from being effective to destroy the information stored in the cores of the respective planes. The inhibit lines produce flux in a direction opposite to the flux produced by the read-out drive lines; hence, they nullify the effect of the read-out drive lines.

The inhibit lines in matrices 116 and 117 are alternately activated to preserve the information read at the first reading station during the read-out cycle which immediately follows the first reading of each card (see example previously given). The inhibit lines for matrices 116 and 117 are alternately activated by the drivers 300 and 301.

The timing for the read-out operation is under control of the read-out pulse generator 200 shown in FIG. 4. The pulse generator 200 supplies pulses to advance read-out counters 202 and 204, these counters in turn activate the column and row drivers. The read-out column and zone drivers 206 and 208 are of the well known type which produce current pulses of sufficient magnitude to read the information from the magnetic core matrix.

The read-out counter 202 has twelve count indicating conditions through which it advances. After the counter 202 has advanced through one cycle, it advances the ten-stage zone counter 204 one position. Each column and zone driver activates a read-out line which passes through one entire column of the matrices 115, 116 and 117. The outputs from the column and zone read-out drivers are connected to the read-out lines of the magnetic core matrices so as to read-out the columns of said matrices in the order previously given, to wit, 1, 41, 81; 2, 42, 82; etc. until the last three columns read out are 40, 80 and 120.

The one hundred and twenty state read-out counter 210 advances each time the read-out pulse generator 200 provides a pulse, the read-out counter 210 thereby indicates which column of the magnetic core matrix is being read out at any particular time. As will be seen later, the counter 210 is used to locate which element was responsible for any malfunction which occurs.

The cores which comprise a check circuit for the document reading system shown herein are shown in FIG. 1. Only the check row, i.e., the fifth row of each of the plines P7 to P18 is shown. It should be noted that there is no inhibit line in the fifth row of planes P7 to P18. Furthermore, the fifth row of cores in planes P1 to P6 is not used in the check circuit of this invention.

As shown in FIG. 1, each row of the card, and hence each row driver, has associated therewith one row of check cores in one of the planes P7 to P18. The first "half set" winding on each of the check cores is connected to its associated row driver. The second "half set" winding on the check cores in planes P7 to P12 is connected to the first brush driver, while the second "half set" winding on the check cores in planes P13 to P18 is connected to the second brush driver.

Hence, by the time each card is read, and assuming that each of the brush and row drivers operated satisfactorily, each of the check cores in planes P7 to P18 will be set. Thereafter, as each column of the matrices is read out by the read-out drivers, a pulse should appear on the four check sense lines CS1 to CS4.

It should be noted that each time a column of the matrix is read out a pulse will appear on line 306. The pulse on line 306 is produced by the read-out pulse generator 200 and is delayed by circuit 307 to give the correct timing. If a pulse does not appear on any one of check sense lines CS1 to CS4 when a column is read out, the inhibit circuits 308 will not prevent the pulse on line 306 from activating the respective indicator and an indication of the absence of the pulse on the respective sense line will be obtained.

It is also important to be able to tell which element in the system failed if any one of the indicators indicates that there has been a failure. Hence, each time an indicator is activated, line 319 is activated, thereby stopping the read-out pulse generator 200. The read-out counter 210 will then indicate which column was reading out when the error occurred.

Furthermore, by noting the condition of the indicators 310, 311, 312 and 313, the source of the failure can be located. An indication on only one of the indicators would signify that a row driver associated with one of the check rows then being read had failed. The particular row driver could be identified by noting which column of the matrix was being read (counter 210 would show this) and which indicator 310 to 313 was active. An indication on two of the indicators would indicate that the particular brush driver associated with these indicators had failed. An indication on all of the indicators would signify that the read-out operation was not successful and hence that either the zone or column driver associated with the particular column of the matrices did not operate satisfactorily.

If the last-mentioned condition was indicated, the machine would then be advanced one read-out cycle. If all of the error indicators were again activated, it would indicate that the zone driver was inoperative. The lack of any error signal would indicate that it had been the column driver which had been inoperative. It should be noted that in the above analysis that it is assumed that not more than one of the row drivers failed at any one time.

While the invention has been particularly shown and described with reference to a preferred embodiment thereof, it will be understood by those skilled in the art that various changes in form and details may be made therein without departing from the spirit and scope of the invention.

I claim:

A device for verifying the operation of a plurality of first write drivers, a plurality of second write drivers, a plurality of first read drivers and a plurality of second read drivers, said drivers being associated with a coincident-current magnetic core memory and operating in a two-part cycle, the first part of said cycle including the coincident activation of all of said first and said second write drivers to write information into said memory, said first write drivers being concurrently pulsed as said second write drivers are sequentially pulsed, the second part of said cycle including the coincident activation of all of said first and said second read drivers to read information out of said memory, different combinations of said read drivers being sequentially pulsed, each of said combinations being made up of one of said first read drivers and one of said second read drivers, said device comprising:

a plurality of first drive lines connected at least two each to the different first write drivers, each of said drive lines being energized with a current pulse upon activation of its associated driver;

a plurality of second drive pulse lines connected one each to the different second write drivers, each of said second drive lines being energized with a current pulse upon activation of its associated driver;

a plurality of third drive lines connected one each to the different first read drivers, each of said third drive lines being energized with a current pulse upon activation of its associated driver;

a plurality of fourth drive lines connected one each to the different second read drivers, each of said fourth drive lines being energized with a current pulse upon activation of its associated driver;

a plurality of bistable magnetic cores, each of said cores being linked by one of said first, second, third, and fourth drive lines, each of said cores being adapted to switch to a first magnetic state in response to current pulses appearing coincidently on the respective first and second drive lines linking it and further being adapted to switch to a second magnetic state in response to current pulses appearing coincidently on the respective third and fourth drive lines linking it, said cores being arranged in a plurality of groups, said groups in turn being arranged in a plurality of sets, the number of groups being equal to the number of first drive lines, each group being linked by a different one of said first drive lines and each set being linked by a different one of said second drive lines, whereby execution of the first part of said cycle of operation of said drivers switches, progressively by sets, all of said cores to said first magnetic state; the number of cores in each group of cores being equal to the total number of different combinations of two of said third and said fourth drive lines, each of said combinations being made up of one of said third drive lines and one of said fourth drive lines, each core in a group of cores being linked by a different one of said combinations, corresponding cores in different groups being linked by the same combination, whereby execution of said second part of said cycle of operation of said drivers switches all of said cores to said second magnetic state;

a plurality of sense lines equal in number to the number of said groups of cores, each of said sense lines linking a different one of said groups and being adapted to conduct an output current pulse in response to the switching from said first to said second magnetic state of one of the cores associated with it so that each sense line conducts an output pulse each time a different combination of read drivers is activated; and, a detecting device connected to each of said sense lines, each of said detecting devices being adapted to produce a signal in response to the absence of an output pulse on the associated sense line, thereby giving an indication of incorrect driver operation and identifying, by virtue of the number of said devices producing said signals, a particular class of driver as the one which produced said incorrect operation.

References Cited in the file of this patent

UNITED STATES PATENTS

| | | |
|---|---|---|
| 2,719,962 | Karnaugh | Oct. 4, 1955 |
| 2,904,781 | Katz | Sept. 15, 1959 |
| 2,964,238 | King | Dec. 13, 1960 |
| 2,973,508 | Chadurjian | Feb. 28, 1961 |